March 26, 1963 — T. BRIMBERG — 3,082,587
AIR FILTER
Filed Feb. 18, 1960 — 2 Sheets-Sheet 1

INVENTOR.
Torsten Brimberg
BY
Edward G. Fernander
his ATTORNEY

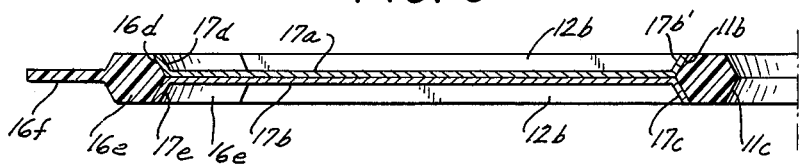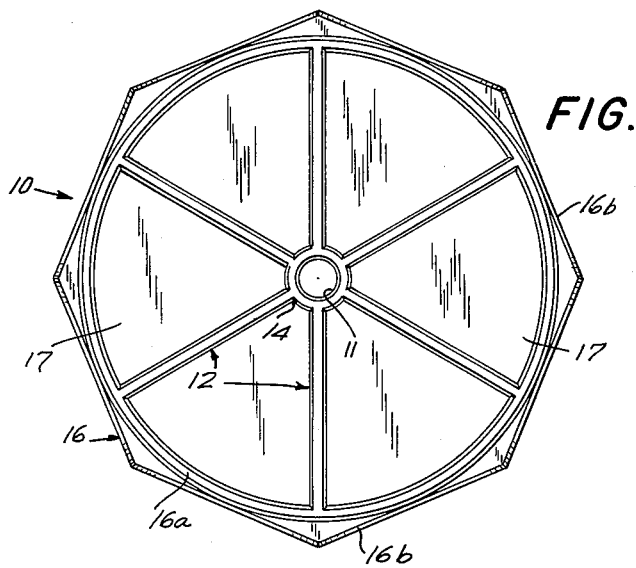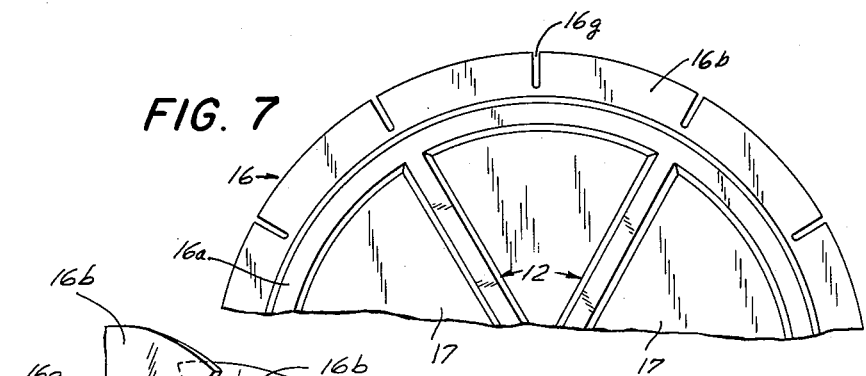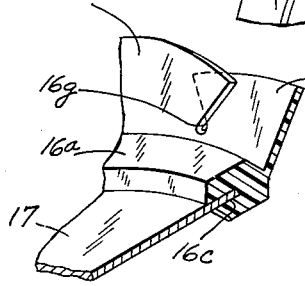

3,082,587
AIR FILTER
Torsten Brimberg, Bandhagen, Sweden, assignor to Aktiebolaget Electrolux, Stockholm, Sweden, a corporation of Sweden
Filed Feb. 18, 1960, Ser. No. 9,579
Claims priority, application Sweden Feb. 24, 1959
9 Claims. (Cl. 55—495)

My invention relates to air filters, and more particularly to so-called "fine filters" for removing fine dust particles and other foreign matter from air circulated through household appliances.

It is an object of my invention to provide an improved air filter of this type having an air permeable sheet united and bonded to a one-piece plastic body member which is simple and inexpensive to manufacture.

Further objects and advantages of my invention will become apparent as the following description proceeds, and the features of novelty which characterize the invention will be pointed out with particularity in the claims annexed to and forming a part of this specification.

For a better understanding of the invention, reference may be had to the following description taken in connection with the accompanying drawings, in which:

FIG. 1 is a side view of an air filter embodying my invention;

FIGS. 2 and 3 are enlarged fragmentary sectional views taken at lines 2—2 and 3—3, respectively, of FIG. 1;

FIG. 5 is a sectional view of an air filter which is similar to FIG. 2 and ilustrates a modification of the invention;

FIG. 6 is a plan view of an air filter like that shown in FIG. 1 bent at its periphery to conform with the interior of a household appliance of non-circular form;

FIG. 7 is an enlarged fragmentary side view of an air filter like that shown in FIG. 1 illustrating another embodiment of the invention; and FIG. 8 is a fragmentary perspective view of the air filter shown in FIG. 7 to illustrate details.

Figure 1:
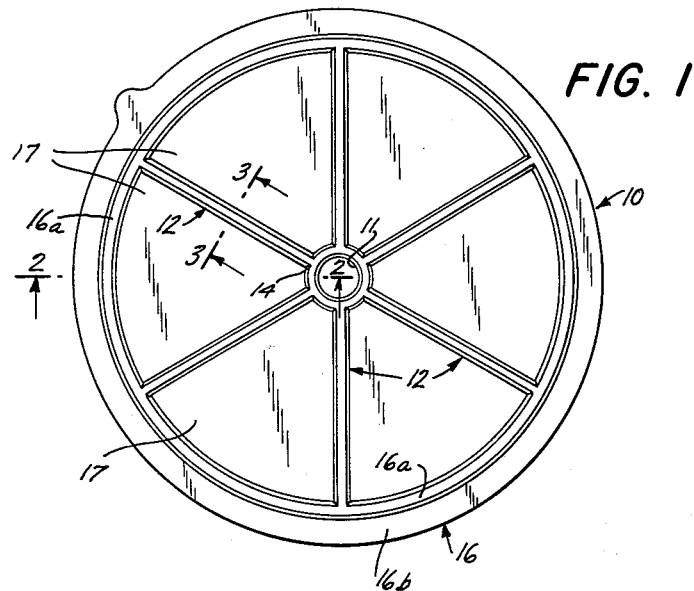
Figure 2:
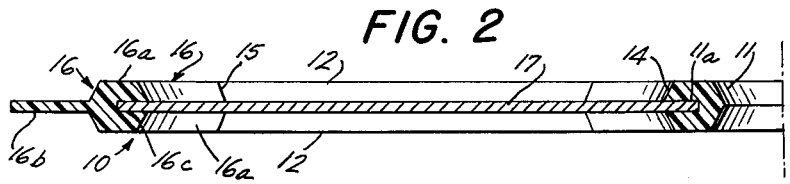

Air filters in accord with the invention are particularly useful in suction cleaners of the household type which usually include a motor-fan unit located within a casing at a region adjacent to a dust bag, such until including a centrifugal fan carried at one end of an electric motor. When the suction cleaner is being operated to clean a surface, dust-laden air is drawn through a suction hose into the interior of the casing by the motor-fan unit. During cleaning, dust collects in the dust bag, and air free of such dust passes through the dust bag and is discharged from the casing by the motor-fan unit. A very fine filter often is provided in the casing at the outlet end thereof through which air passes in order to remove fine dust particles and other foreign matter therefrom which tend to pass through a conventional dust bag which may be formed of cloth, for example, that is permeable to air.

Referring to FIGS. 1 to 4, I have provided an improved air filter 10 which may be conveniently employed as a fine filter in suction cleaners having casings of different size. The air filter 10 comprises an apertured hub or tubular section 11 and rib structure comprising a number of spaced ribs 12 which are distributed about the hub 11 and extend radially therefrom at 14. The outer ends of the ribs 12 are fixed at 15 to the inner periphery of a rim 16 having an inner section 16a whose thickness is about the same as that of the hub 11 and an outer flat flexible section 16b.

Figure 3:
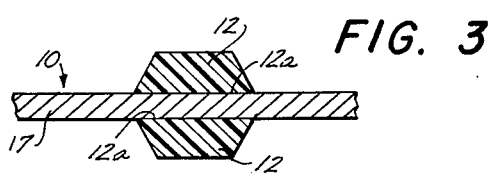

The filter 10 is provided with sheeting 17 of porous material which is permeable to air and preferably microporous in character. The sheet or membrane 17, which is apertured and in the form of a disk, is positioned between the inner surfaces 12a of opposing ribs 12, as best shown in FIG. 3. Essentially, the ribs 12 are split in a lengthwise direction with their inner surfaces 12a back to back. The hub 11 is formed with a groove 11a within which the inner periphery of the sheet 17 is held, and the rim section 16a is formed with a groove 16c within which the outer periphery of the sheet is held. It will be understood that several porous sheets 17 may be held together between the hub 11 and rim section 16a, the sheets in such case being disposed between opposing ribs 12 in the manner shown in FIG. 3.

Figure 4:
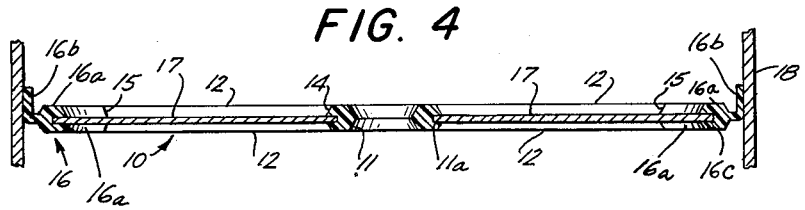
FIG. 4 is an enlarged sectional view of the air filter shown in FIG. 1 positioned within a household appliance.

Since the outer flat section 16b is flexible, the filter 10 can be employed as a so-called "fine filter" in suction cleaners having casings of different size. As illustrated in FIG. 4, the filter 10 can be positioned within a casing 18 in such a manner that the flange 16b is bent at an angle of about 90° to a plane passing through to filter 10, so that the filter will be held in air-tight relation with the casing at a region which is adjacent to the outlet of the suction cleaner through which air is discharged. The apertured hub 11 is adapted to receive suitable fastening member which passes therethrough and is fixed to a suitable part of the suction cleaner normally positioned within the casing 18.

FIG. 5 illustrates another embodiment of the invention which is generally like that shown in FIGS. 1 to 4 and differs therefrom in that two sheets 17a and 17b of porous material in abutting relation are held in place between the inner surfaces of opposing ribs 12b in the manner shown in FIG. 3. The sheets 17a and 17b are apertured and of dished form, their inner and outer perpheries 17b', 17c and 17d, 17e being fixed at 11b and 16d to the sloping wall surfaces at the outer periphery of the hub 11c and inner periphery of the inner rim section 16e, respectively. As in the first described embodiment, the rim in FIG. 5 includes an outer flat flexible rim section 16f which can assume the shape of the filter 10 in FIG. 4. In FIG. 5 it will be seen that the top sloping wall surface 16d at the rim 16e defines a wall which slopes outward from one side of a horizontal plane passing through the layers 17a and 17b of air-permeable material, the wall 16d sloping at an acute angle to the plane and in a direction toward the outer periphery of the rim 16e; and that the top sloping wall surface 11b at the hub or part 11c removed from the rim 16e defines a wall which slopes outward from the same side of the horizontal plane passing through the layers 17a and 17b, the wall 11b sloping at an acute angle to the plane and in a direction from the rim 16. The top layer 17a of air-permeable material is provided with outer and inner peripheral edge portions 17d and 17b', respectively, which overlie the sloping walls 16d and 11b and are fixed thereto.

FIG. 6 illustrates the shape the filter 10 of FIGS. 1 to 4 will assume when it is positioned in a casing which is octagonal in cross-section. In this instance, the outer flat rim section 16b will be bent in the manner shown in FIG. 4 and assume the shape of the eight-sided casing within which it is held.

In order to facilitate positioning a filter embodying the invention within a casing, the outer flat rim section 16b of FIGS. 1 to 4 may be formed with radial slits 16g, as illustrated in FIG. 7. When the filter of FIG. 7 is positioned within a casing, portions of the outer rim section 16b will overlap, as shown in FIG. 8, to provide a snug and air-tight fit of the filter within the casing.

The apertured hub, ribs and rim of the filters illustrated and described above may be formed in one piece, the different parts of which are integrally joined to one another. When the filters are formed in this manner from a suitable thermoplastic, such as polyethylene, for example, the sheet 17 of air permeable material may be positioned between cooperating parts of a two-part die or mold provided with suitable cavities and passages adapted to receive polyethylene in a fluid or relatively soft state by injection or similar manner. Similarly, each of the sheets 17a and 17b of dished form in the embodiment of FIG. 5 may be positioned in one of two cooperating die parts provided with suitable cavities and passages adapted to receive polyethylene which is in a fluid or relatively soft state at an elevated temperature.

Filters of the type illustrated and described above may be readily formed in this manner and possess the advantage that, when the polyethylene has cooled and solidified, it will have become united and bonded to the porous sheets at the hub and rim and at the inner surfaces of the rib sections. The air permeable porous sheet 17 in the embodiment of FIGS. 1 to 4 and the porous sheets 17a and 17b in the modification of FIG. 5 desirably are formed from a mixture of fibrous thermoplastic material and other fibrous material, such as mineral fibers or textile fibers or both, the mixture preferably being felted and in the form of a membrane. When the polyethylene is at an elevated temperature and in a fluid or relatively soft state, as explained above, the polyethylene is brought into intimate physical contact with the microporous air permeable sheets. When the polyethylene is heated to a sufficiently high temperature and is flowable, it impregnates the pores of the fibrous material forming the porous sheets and welds and fuses the sheets and hub, ribs and rim together to provide a filter all the parts of which are integrally united and joined to one another. In the embodiment of FIG. 5, for example, the portions of the sheets or membranes 17a and 17b held between opposing ribs 12b are united and joined to one another and to the ribs to form radially extending spokes which are relatively strong and yet flexible in a lengthwise direction to allow bending and flexing of the filter when being inserted into and removed from a household appliance.

An air filter like the one described above and illustrated in FIGS. 1 to 4 has been constructed having two sheets 17 of microporous material in abutting relation, the hub 11 having an opening which is about 13/32 inch in diameter and an outer flat rim section 16b whose outer diameter is about 5 5/16 inches. In this construction, each porous sheet or membrane is about 1/64 inch thick and united and welded to a body of polyethylene plastic in which the overall thicknesses of the hub 11, ribs 12 and inner rim section 16a are about 5/32 inch. The maximum width of the hub 11 and inner rim section 16a are about 3/16 inch while the outer flexible rim section 16b is about 5/16 inch wide and about 1/64 inch thick. The ribs 12 at their outer surfaces are about 2 5/16 inches long and their maximum width, at the inner surfaces which are in physical contact with the porous sheets, is about 5/32 inch.

Filters formed of polyethylene possess desirable physical properties in that all parts, including the hub, ribs and both rim sections, are formed of comparatively soft and yielding material which makes it easy to bend and reshape the filter elements. Further, the filters of the invention formed of polyethylene are relatively strong and rugged and separation of the porous sheet 17 in FIGS. 1 to 4 and separation of sheets 17a and 17b in FIG. 5 from the hub, rib and rim parts formed of polyethylene does not occur with ordinary handling of the filter units and their use as so-called "fine filters" in household appliances.

Although I have illustrated and described particular embodiments of my invention, I desire not to be limited to the particular arrangements set forth, and I intend in the following claims to cover all modifications which do not depart from the spirit and scope of the invention.

I claim:

1. An article of the class described comprising a body of air-impermeable material including rib structure and a rim at its periphery which is fixed thereto, the inner surface of said rim having a pair of walls which are adjacent to one another at their inner edges and slope outward from their inner edges in a direction toward the outer periphery of the rim and form an angle therebetween which is greater than 90° and less than 180°, said rib structure including ribs split in a lengthwise direction to provide rib sections with their inner surfaces back to back, and sheeting of air-permeable material held between said rib sections, said sheeting having a pair of outer peripheral edge portions, each of said outer peripheral edge portions overlying a different one of said outwardly sloping walls and being fixed thereto.

2. An article as set forth in claim 1 in which said rib structure includes a part removed from said rim to which a plurality of said ribs are fixed, the outer peripheral surface of said part having a pair of walls which are adjacent to one another at their inner edges and slope outward from their inner edges in a direction from the rim and form an angle therebetween which is greater than 90° and less than 180°, said sheeting of air-permeable material having a pair of inner peripheral edge portions, each of said inner peripheral edge portions overlying a different one of the last-mentioned outwardly sloping walls and being fixed thereto.

3. An article as set forth in claim 1 in which said sheeting comprises a plurality of layers of air-permeable material, said outer peripheral outer edge portions being formed by the outermost portions of the outer layers of air-permeable material.

4. An article as set forth in claim 2 in which said sheeting comprises a plurality of layers of air-permeable material, the outer peripheral edge portions being formed by the outermost portions of the outer layers of air-permeable material, the outer layers of air-permeable material having inner portions removed from the outermost portions, and each of the inner peripheral edge portions being formed by a different one of the inner portions of the outer layers.

5. An article of the class described comprising a body of air-permeable material including rib structure and a rim at its periphery which is fixed thereto, said rib structure including ribs split in a lengthwise direction to provide rib sections with their inner surfaces back to back and a part removed from said rim to which a plurality of said ribs are fixed, the outer peripheral surface of said part having a pair of walls which are adjacent to one another at their inner edges and slope outward from their inner edges in a direction from the rim and form an angle therebetween which is greater than 90° and less than 180°, and sheeting of air-permeable material held between said rib sections, the outer peripheral edge of said sheeting being fixed to said rim, and said sheeting having a pair of inner peripheral edge portions, each of said inner peripheral edge portions overlying a different one of the outwardly sloping walls and being fixed thereto.

6. An article as set forth in claim 5 in which said sheeting comprises a plurality of layers of air-permeable material, the outer layers having inner portions removed from the peripheral edge portions, and each of the inner peripheral edge portions being formed by a different one of the inner portions of the outer layers.

7. An article of the class described comprising a body of air-impermeable material including rib structure and a rim at its periphery which is fixed thereto, said rib structure including ribs split in a lengthwise direction to provide rib sections with their inner surfaces back to back, sheeting of air-permeable material held between said rib sections, the inner surface of the rim having a wall which slopes outward from one side of a plane passing through said sheeting at the vicinity of said rim, said wall sloping at an acute angle to said plane and in a direction toward the outer periphery of said rim, said sheeting having an outer peripheral edge portion which overlies said sloping wall and is fixed thereto.

8. An article of the class described comprising a body of air-permeable material including rib structure and a rim at its periphery which is fixed thereto, said rib structure including ribs split in a lengthwise direction to provide rib sections with their inner surfaces back to back and a part removed from said rim to which a plurality of said ribs are fixed, sheeting of air-permeable material held between said rib sections, the outer peripheral edge of said sheeting being fixed to said rim, the outer surface of said part having a wall which slopes outward from a plane passing through said sheeting at the vicinity of said part, said wall sloping at an acute angle to said plane and in a direction from the rim, and said sheeting having an inner peripheral edge portion which overlies said sloping wall and is fixed thereto.

9. An article as set forth in claim 7 in which said rib structure includes a part removed from said rim to which a plurality of said ribs are fixed, the outer surface of said part having a wall which slopes outward from the one side of said plane passing through said sheeting at the vicinity of said part, said last-mentioned wall sloping at an acute angle to said plane and in a direction from said rim, and said sheeting having an inner peripheral edge portion which overlies said last-mentioned sloping wall portion and is fixed thereto.

References Cited in the file of this patent

UNITED STATES PATENTS

| | | |
|---|---|---|
| 250,331 | Atwood et al. | Dec. 6, 1881 |
| 514,515 | Stevens | Feb. 13, 1894 |
| 1,215,974 | Orem | Feb. 13, 1917 |
| 2,008,067 | Faber | July 16, 1935 |
| 2,252,724 | Myers | Aug. 19, 1941 |
| 2,345,265 | Jepson et al. | Mar. 28, 1944 |
| 2,784,132 | Maisel | Mar. 5, 1957 |

FOREIGN PATENTS

| | | |
|---|---|---|
| 1,027,343 | France | Feb. 11, 1953 |
| 69,001 | France | Mar. 24, 1958 |

(Addition to No. 1,098,513)